(12) United States Patent
Prescott (10) Patent No.: US 8,836,276 B2
(45) Date of Patent: Sep. 16, 2014

(54) CHARGING BATTERIES FOR ELECTRONIC DEVICES BY TALKING

(75) Inventor: Nigel Paul Prescott, Steeton (GB)

(73) Assignee: Eldon Technology Limited (GB)

( * ) Notice: Subject to any disclaimer, the term of this patent is extended or adjusted under 35 U.S.C. 154(b) by 598 days.

(21) Appl. No.: 13/042,330

(22) Filed: Mar. 7, 2011

(65) Prior Publication Data
US 2012/0229073 A1    Sep. 13, 2012

(51) Int. Cl.
*H02J 7/00* (2006.01)
*H02K 35/04* (2006.01)
*H02N 2/18* (2006.01)

(52) U.S. Cl.
CPC ............... *H02K 35/04* (2013.01); *H02N 2/18* (2013.01); *H02J 7/00* (2013.01)
USPC ....................................................... 320/107

(58) Field of Classification Search
USPC ........................................ 320/107; 379/420.01
See application file for complete search history.

(56) References Cited

U.S. PATENT DOCUMENTS

| 3,928,723 | A | * | 12/1975 | Kai ........................ 379/420.01 |
| 5,889,383 | A | * | 3/1999 | Teich ........................... 320/107 |
| 6,076,000 | A | * | 6/2000 | Lee ............................ 455/569.2 |
| 8,032,188 | B1 | * | 10/2011 | Walker, Jr. ..................... 455/573 |
| 2001/0043715 | A1 | * | 11/2001 | Geisenberger et al. ....... 381/412 |
| 2008/0122317 | A1 | * | 5/2008 | Fazzio et al. ................. 310/328 |

* cited by examiner

*Primary Examiner* — Arun Williams
(74) *Attorney, Agent, or Firm* — Kilpatrick Townsend & Stockton LLP (57) ABSTRACT

A device includes a battery that is operable to power the device. A power generating mechanism includes a diaphragm that generates power when the diaphragm vibrates. The diaphragm vibrates in response to force being exerted upon the diaphragm. Control circuitry of the electronic device utilizes the generated power to charge the battery. In some implementations, the power generating mechanism includes a force focusing guide that directs and/or focuses the force onto the diaphragm. In various implementations, the power generating mechanism may includes a wire coil that moves with respect to a magnet when the diaphragm vibrates, causing power to generate within the wire coil. In various other implementations, the power generating mechanism includes a piezoelectric element that is positioned adjacent to the diaphragm and is compressed and/or decompressed by vibration of the diaphragm, causing power to generate within the piezoelectric element.

20 Claims, 6 Drawing Sheets

CHARGING BATTERIES FOR ELECTRONIC DEVICES BY TALKING

FIELD OF THE INVENTION

This disclosure relates generally to electronic devices, and more specifically to charging a battery of an electronic device by talking, breathing on the electronic device, or by performing similar operations.

SUMMARY

The present disclosure discloses devices, systems, and methods for charging batteries for electronic devices. An electronic device may include one or more batteries that are operable to provide power for the operation of the electronic device. A power generating mechanism, which includes one or more diaphragms, may generate power when the diaphragm vibrates. The diaphragm may vibrate in response to force being exerted upon the diaphragm, such as sound waves, air movement, atmospheric pressure, mechanical force, and/or other kinds of force. Control circuitry of the electronic device may obtain the power generated by the power generating mechanism and may utilize the generated power to charge the one or more batteries, provide the generated power for the operation of the electronic device, and/or otherwise utilize the generated power.

In some implementations, the power generating mechanism may include one or more force focusing guides that direct and/or focus the force onto the diaphragm. As such, the force focusing guide may maximize the effect of the force upon the diaphragm such that the maximum amount of power may be generated in response to such force. In implementations where the diaphragm is vibrated by sound waves of a user's voice, the force focusing guide may be one or more sound wave focusing guides that focus and/or direct the sound waves of the user's voice onto the diaphragm. Such a sound wave focusing guide may be conically shaped and/or funnel-shaped with a larger diameter end that is distal to the diaphragm and a smaller diameter end that is proximate to the diaphragm. As such, the shape of the sound wave focusing guide may focus and/or direct sound waves entering the sound wave focusing guide onto the diaphragm.

In various implementations, the power generating mechanism may include one or more wire coils coupled to the diaphragm and disposed to move with respect to one or more magnets. In such implementations, when the diaphragm vibrates, the vibration of the diaphragm may cause the wire coil to move with respect to the magnet and thusly generate power within the wire coil. In various other implementations, the power generating mechanism may include one or more piezoelectric elements that are positioned adjacent to the diaphragm such that the piezoelectric element may be compressed and/or decompressed by vibration of the diaphragm. In such implementations, when the diaphragm vibrates, the vibration of the diaphragm may compress and/or decompress the piezoelectric element and thusly generate power within the piezoelectric element.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Electronic devices (such as laptop computers, tablet computers, mobile computers, cellular telephones, voice recorders, smart phones, personal digital assistants, digital music players, digital video players, cameras, video recorders, audio recorders, portable kitchen appliances, digital clocks, electrical medical devices, and so on) are often powered utilizing one or more batteries. Some electronic devices may be able to utilize power from one or more batteries or one or more fixed power sources in order to operate whereas other electronic devices may only be able to utilize power from one or more batteries in order to operate. Regardless, many electronic devices utilize one or more batteries to power at least a portion of their operation.

However, the amount of power that a particular battery can provide is finite. Eventually, a battery may not be able to provide power required by an associated electronic device and may need to be recharged and/or replaced. Battery life may be a significant issue for many electronic devices.

The present disclosure discloses devices, systems, and methods for charging batteries for electronic devices. An electronic device may include one or more batteries that are operable to provide power for operation of the electronic device. A power generating mechanism, which includes one or more diaphragms, may generate power when the diaphragm vibrates, such as when a user talks into the diaphragm. In implementations where the diaphragm is vibrated by sound waves of a user's voice, the power generation mechanism may include one or more sound wave focusing guides to focus and/or direct the sound waves of the user's voice into the diaphragm. Control circuitry of the electronic device may obtain the power generated by the power generating mechanism and may utilize the generated power to charge the one or more batteries and/or provide the generated power for the operation of the electronic device. As such, the electronic device may be able to utilize the one or more batteries for a longer duration of time that would otherwise be possible. Further, the electronic device may be able to utilize the one or more batteries more efficiently than would otherwise be possible. Additionally, the electronic device may be able to utilize the one or more batteries more conveniently for a user than would otherwise be possible.

Figure 1:
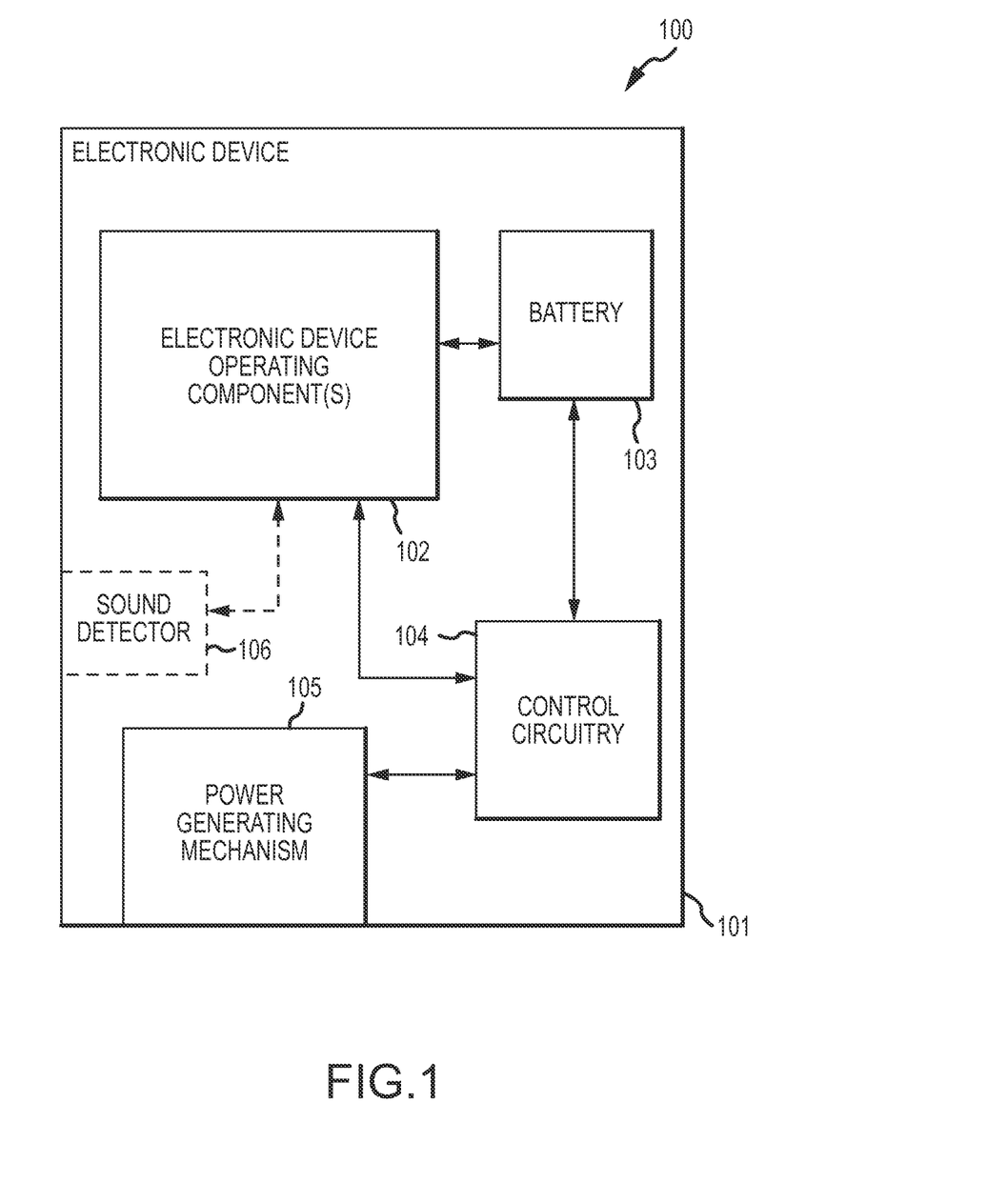
FIG. 1 is a block diagram illustrating a system for charging batteries for electronic devices.

FIG. 1 is a block diagram illustrating a system 100 for charging batteries for electronic devices. The system 100 may include a electronic device 101 which may be any kind of electronic device such as a laptop computer, a tablet computer, a mobile computer, a cellular telephone, a voice recorder, a smart phone, a personal digital assistant, a digital music player, a digital video player, a camera, a video recorder, an audio recorder, a portable kitchen appliance, a digital clocks, and electrical medical device, and/or other such electronic device. The electronic device may include one or more batteries 103 and one or more electronic device operating components 102 that are operable to perform one or more electronic device functions utilizing power obtained from the battery.

The electronic device operating component 102 may include one or more of a variety of different interconnected elements (not shown) that are operable to cooperate in order to perform at least a portion of the one or more electronic device functions. In some implementations, the electronic device operating component may include one or more one or more processing units, one or more input/output components, one or more user interface components, one or more communication components, one or more non-transitory storage media (which may take the form of, but is not limited to, a magnetic storage medium; optical storage medium; magneto-optical storage medium; read only memory; random access memory; erasable programmable memory; flash memory; and so on), and/or one or more other electronic device elements. In such implementations, the one or more processing units may perform a variety of electronic device functions by executing one or more sets of instructions stored in the one or more non-transitory storage media.

The electronic device 101 may also include control circuitry 104 and one or more power generating mechanisms 105. The power generating mechanism may include one or more diaphragms (see the example diaphragms 202 in FIGS. 2A-2B and 302 in FIGS. 3A-3B) that are operable to vibrate in response to exertion of force. Such force may include, but is not limited to, sound waves, air movement, mechanical force, and/or any other kind of force that is operable to cause the diaphragm to move. In response to vibration of the diaphragm, the power generating mechanism generates power.

In one or more implementations, the power generating mechanism may include one or more optional force focusing guides that direct and/or focus the force at the diaphragm in order to maximize the effect of the force upon the diaphragm. For example, if the force is sound waves (such as where the power generation mechanism generates power in response to a user talking into the diaphragm), the power generating mechanism may include one or more sound wave focusing guides. Such sound wave focusing guides may be conically-shaped and/or funnel shaped in various implementations (having a narrower diameter at a portion located proximate to the diaphragm and a wider diameter at a portion located distal to the diaphragm) in order to maximize the effect of the sound waves upon the diaphragm by focusing and/or directing the sound waves onto the diaphragm.

The control circuitry 104 may receive the power generated by the power generating mechanism 105 and may utilize such power to charge the battery 103, power operation of the electronic device operating component 102, and/or otherwise make use of the power. The control circuitry may include a variety of interconnected capacitors, resistors, decision gates, integrated circuits, circuit boards, inductors, transducers, diodes, switches, transistors, and/or other electrical components that operate together to receive power from the power generating mechanism, direct power from the power generating mechanism to the battery and/or the electronic device operating component, regulate power provided by the battery to the electronic device operation component, and/or otherwise utilize the power generated by the power generating mechanism.

Figure 2A:
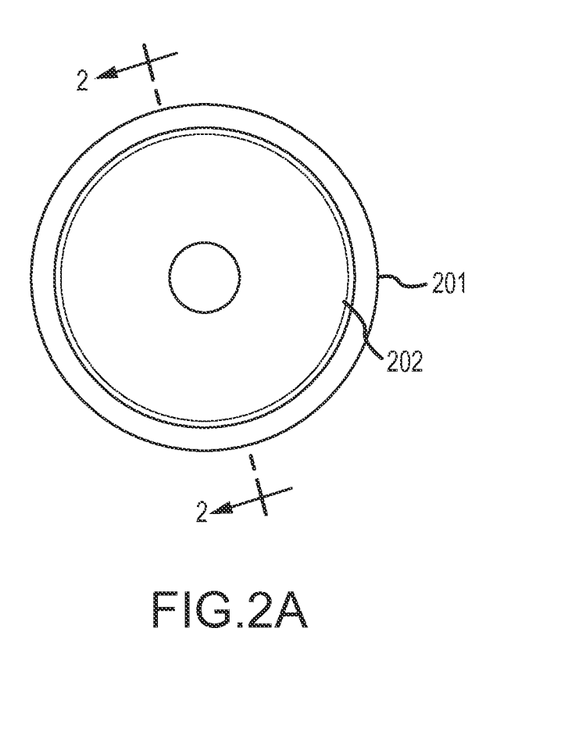
FIG. 2A is a top plan view of a first example power generating mechanism that may be utilized in the system of FIG. 1.
Figure 2B:
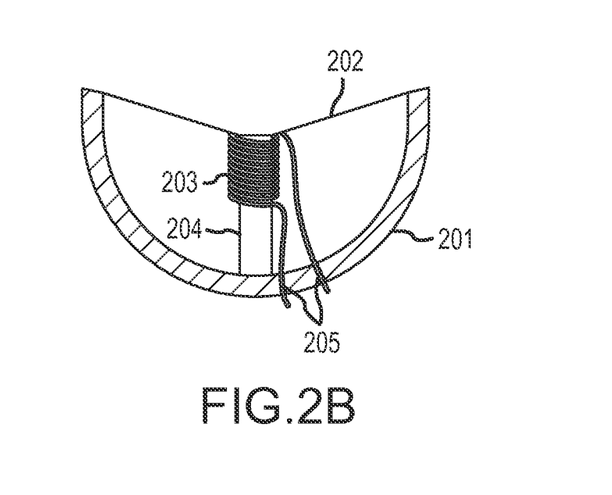
FIG. 2B is a cross-sectional front plan view of first example power generating mechanism of FIG. 2A, as taken along line 2-2 in FIG. 2A.

FIG. 2A is a top plan view of a first example power generating mechanism that may be utilized in the system of FIG. 1. As illustrated, the first example power generating mechanism includes a diaphragm 202 flexibly coupled to a housing 201. FIG. 2B is a cross-sectional front plan view of the first example power generating mechanism of FIG. 2A, as taken along line 2-2 in FIG. 2A. As illustrated, in addition to the housing 201 and the diaphragm 202, the first example power generating mechanism also includes a magnet 204 (which may be a permanent magnet), a wire coil 203 that is coupled to the diaphragm 202 and disposed to move with respect to the magnet 204, and an electrical connection 205 that leads to the control circuitry 104. When the diaphragm 202 vibrates, as the diaphragm 202 is connected to the wire coil 203, the vibration of the diaphragm 202 causes the wire coil 203 to move with respect to the magnet 204. The movement of the wire coil 203 with respect to the magnet 204 causes power to be generated in the wire coil 203, which is then provided to the control circuitry 104 via the electrical connection 205. Hence vibration of the diaphragm 202 may cause the first example power generating mechanism to generate power and supply such generated power to the control circuitry.

Figure 2C:
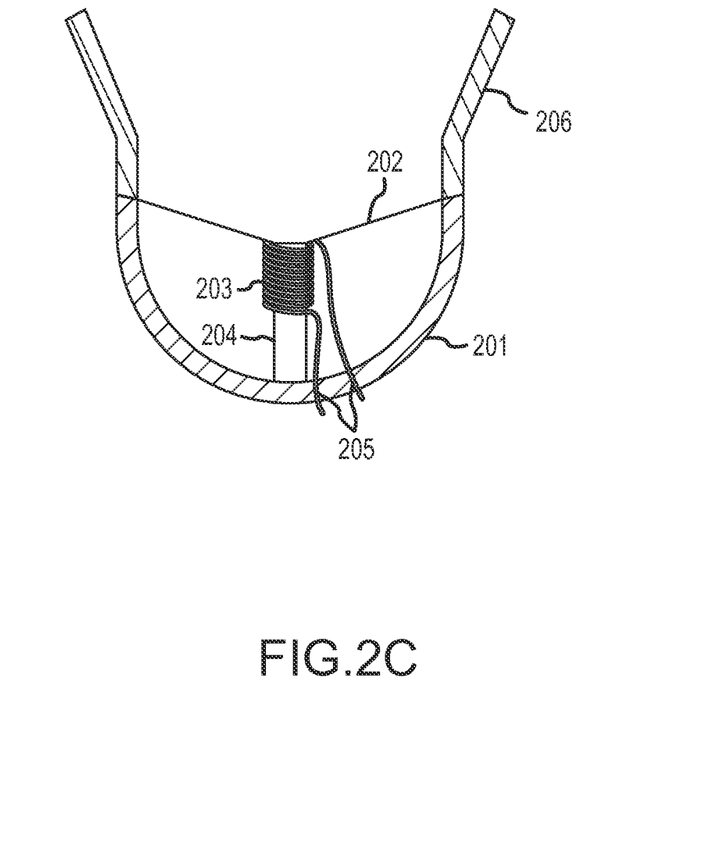
FIG. 2C is a cross-sectional front plan view of the first example power generating mechanism of FIG. 2A, as taken along line 2-2 in FIG. 2A, illustrating the first example power generating mechanism including an optional sound wave focusing guide.

In some implementations, the force that vibrates the diaphragm 202 may be sound waves, such as when a user talks into the diaphragm 202 in order to generate the power. As such, FIG. 2C illustrates a cross-sectional front plan view of the first example power generating mechanism of FIG. 2A, as taken along line 2-2 in FIG. 2A, showing the first example power generating mechanism including an optional sound wave focusing guide 206. The optional sound wave guide 206 may be conically shaped as is illustrated (and/or funnel-shaped), having a smaller diameter at an end disposed proximate to the diaphragm 202 and a larger diameter at another end disposed distal to the diaphragm 202. As such, the shape of the optional sound wave guide may direct sound waves that enter the optional sound wave guide and/or focus such sound waves into the diaphragm 202, increasing the amount that the sound waves vibrate the diaphragm 202.

Figure 3A:
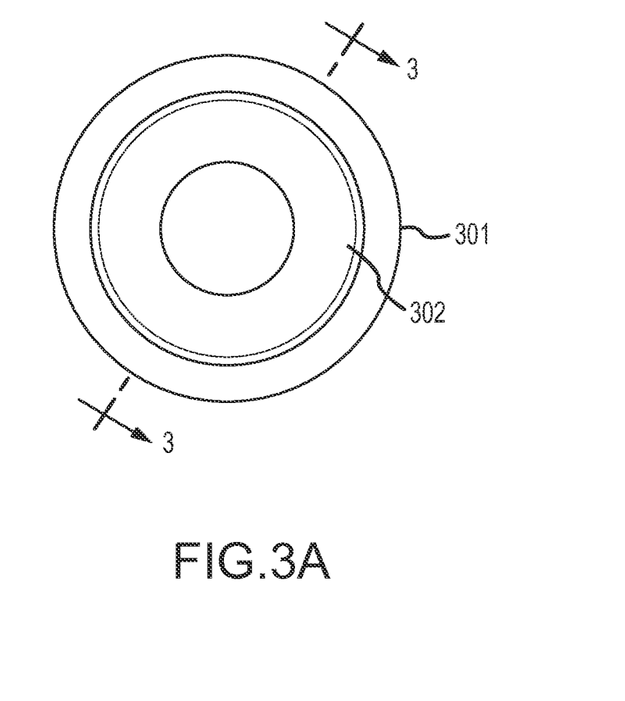
FIG. 3A is a top plan view of a second example power generating mechanism that may be utilized in the system of FIG. 1.
Figure 3B:
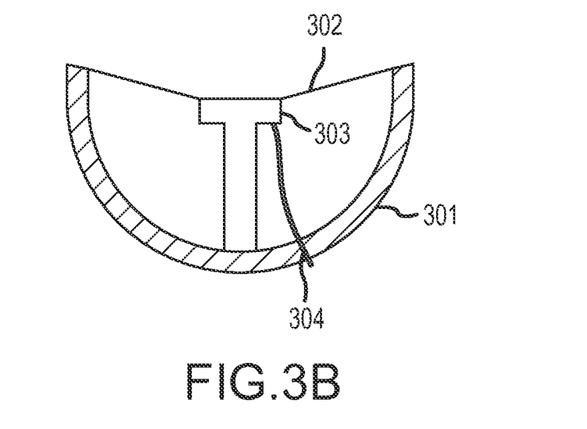
FIG. 3B is a cross-sectional front plan view of the second example power generating mechanism of FIG. 3A, as taken along line 3-3 in FIG. 3A.

FIG. 3A is a top plan view of a second example power generating mechanism that may be utilized in the system of FIG. 1. As illustrated, the second example power generating mechanism includes a diaphragm 302 flexibly coupled to a housing 301. FIG. 3B is a cross-sectional front plan view of the second example power generating mechanism of FIG. 3A, as taken along line 3-3 in FIG. 3A. As illustrated, in addition to the housing 301 and the diaphragm 302, the second example power generating mechanism also includes a piezoelectric element 303 (which is located adjacent to the diaphragm 302) and an electrical connection 304 (electrically coupled to the piezoelectric element 303) that leads to the control circuitry 104. When the diaphragm 302 vibrates, as the diaphragm 302 is adjacent to piezoelectric element 303, the vibration of the diaphragm 302 causes the piezoelectric element 303 to compress and/or decompress. The compression and/or decompression of the piezoelectric element 303 causes power to be generated in the piezoelectric element 303, which is then provided to the control circuitry 104 via the electrical connection 304. Hence vibration of the diaphragm 302 may cause the second example power generating mechanism to generate power and supply such generated power to the control circuitry.

Figure 3C:
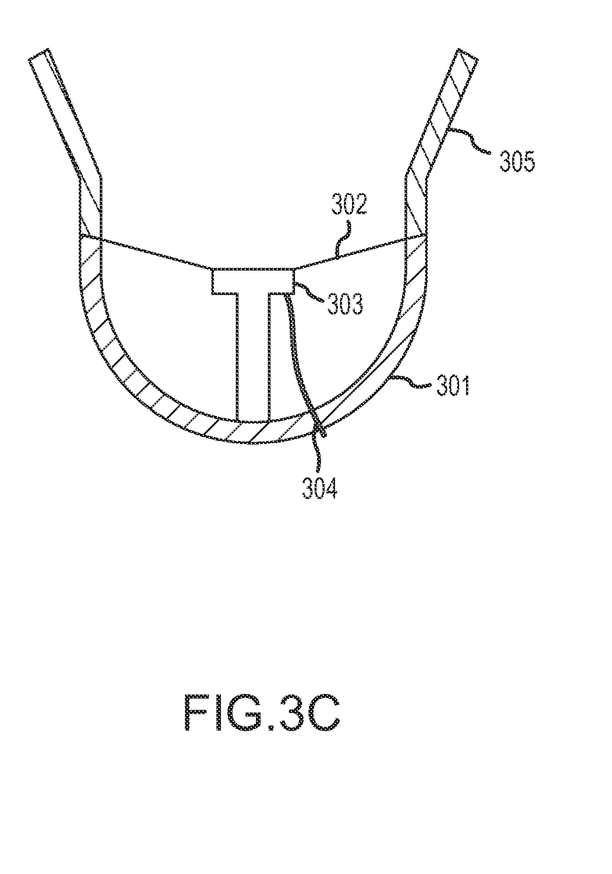
FIG. 3C is a cross-sectional front plan view of the second example power generating mechanism of FIG. 3A, as taken along line 3-3 in FIG. 3A, illustrating the second example power generating mechanism including an optional sound wave focusing guide.

In some implementations, the force that vibrates the diaphragm 302 may be one or more sound waves, such as when a user talks into the diaphragm 302 in order to generate the power. As such, FIG. 3C illustrates a cross-sectional front plan view of the second example power generating mechanism of FIG. 3A, as taken along line 3-3 in FIG. 3A, showing the second example power generating mechanism including an optional sound wave focusing guide 305. The optional sound wave guide 305 may be conically shaped as is illustrated (and/or funnel-shaped), having a smaller diameter at an end disposed proximate to the diaphragm 302 and a larger diameter at another end disposed distal to the diaphragm 302. As such, the shape of the optional sound wave guide may direct sound waves that enter the optional sound wave guide and/or focus such sound waves into the diaphragm 302, increasing the amount that the sound waves vibrate the diaphragm 302.

Although the present disclosure describes and illustrates particular power generation mechanisms in FIGS. 2A-2C and 3A-3C that may be utilized to implement the power generating mechanism 105, it should be understood that these approaches are merely for the purposes of example. In other implementations, other power generating mechanisms 105 that generate power when a diaphragm is vibrated and are configured differently than those illustrated and described with respect to FIGS. 2A-2C and 3A-3C may be utilized without departing from the scope of the present disclosure.

Figure 4:
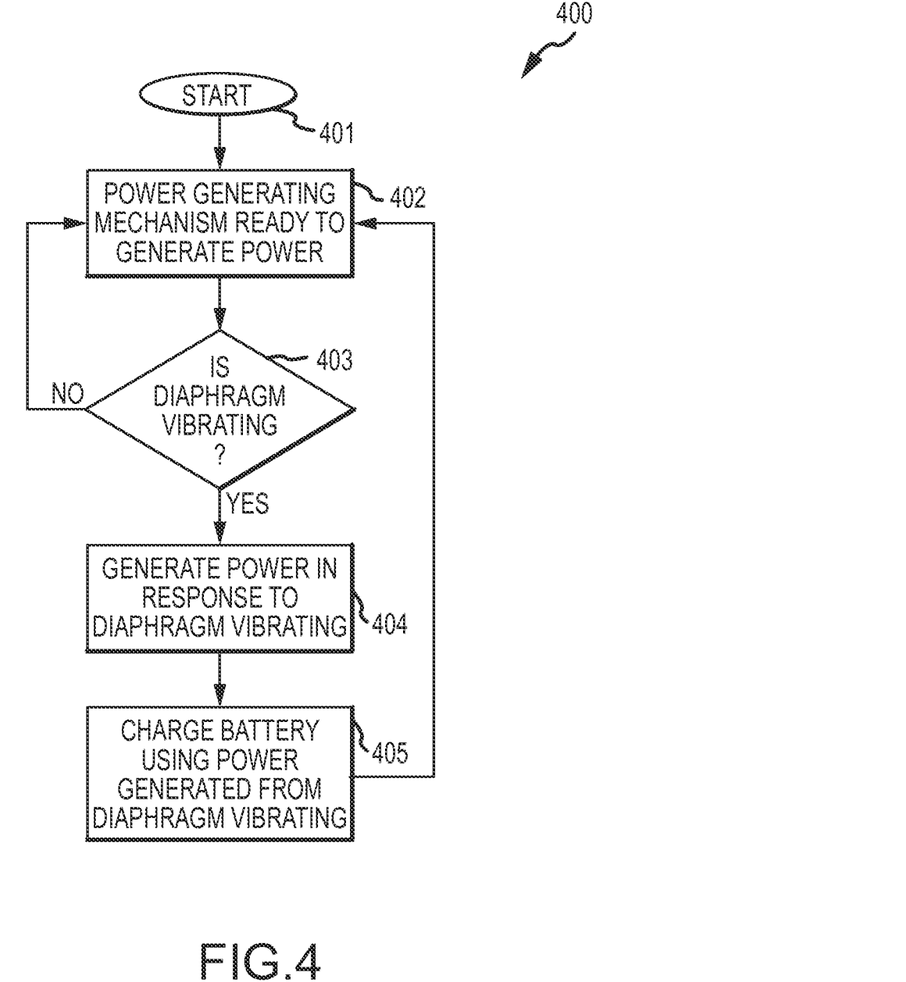
FIG. 4 is a flow chart illustrating a method for charging batteries for electronic devices. This method may be performed by the system of FIG. 1.

FIG. 4 illustrates a method 400 for charging batteries for electronic devices. The method 400 may be performed by the electronic device 101 of FIG. 1. The flow begins at block 401 and proceeds to block 402 where the power generating mechanism 105 of the electronic device 101 is ready to generate power. The flow then proceeds to block 403. At block 403, if the diaphragm of the power generating mechanism 105 is vibrating, the flow proceeds to block 404. Otherwise, the flow returns to block 402 where the power generating mechanism 105 of the electronic device 101 is ready to generate power.

At block 404, when the diaphragm of the power generating mechanism 105 is vibrating, the power generating mechanism 105 generates power in response to the vibration of the power generating mechanism 105. The flow then proceeds to block 405 where the control circuitry 104 charges the battery 103 utilizing the power generated by the power generating mechanism 105. Then, the flow returns to block 402 where the power generating mechanism 105 of the electronic device 101 is ready to generate power.

Although the method 400 is illustrated as a linear series of operations, in various implementations one or more of the operations of the method may be performed simultaneously and/or in an order other than that illustrated. The present disclosure merely presents the operations of method 400 as a linear series for the purposes of clarity and as representing one possible implementation.

Returning to FIG. 1, in some implementations the control circuitry 104 may be operable to utilize power generated by the power generating mechanism 105 to charge the battery 103 when the electronic device operating component 102 is not currently operating. As such, in these implementations, charging the battery and utilizing the electronic device 101 may be mutually exclusive operations. However, in other implementations the control circuitry may be operable to utilize power generated by the power generating mechanism to charge the battery when the electronic device operating component is operating. In still other implementations, the control circuitry may be operable to charge the battery regardless of whether or not the electronic device operating component is currently operating.

In one or more implementations the electronic device 101 may be a device that is operable to perform one or more electronic device functions related to sound received by one or more sound detectors (or sensors) 106 such as a microphone. For example, the electronic device may be a device such as a cellular telephone, a smart phone, a portable computer, a tablet computer, a mobile computer, a voice recorder, and audio recorder, a video recorder, a personal digital assistant, an electronic medical device, and/or other electronic device that includes functions related to receiving sound. In such implementations, the power generating mechanism 105 may be located in such proximity to the sound detector 106 that use of the electronic device functions (such as talking on a cellular telephone) simultaneously vibrates the diaphragm of the power generating mechanism, thus generating power while a user utilizes the electronic device functions of the electronic device.

The power generating mechanism may be located in such proximity to the sound detector by being disposed adjacent to the sound detector, by including the sound detector, by being the same component as the sound detector, and/or any other arrangement where the power generating mechanism is located in such proximity to the sound detector. Although the power generating mechanism is discussed above as being the same component as the sound detector in implementations where the power generating mechanism is operable to generate power while the electronic device operating component 102 is in use, in various implementations the power generating mechanism and the sound detector may be the same component of an electronic device that is only able to generate power utilizing the power generating mechanism when the sound detector is not being utilized for performing electronic device functions.

Although the power generating mechanism 105 is illustrated and described above as being an integrated internal component of the electronic device 101, other contemplated arrangements are possible without departing from the scope of the present disclosure. In various implementations, the power generating mechanism may be a separate component from the electronic device that is operable to electrically connect to the electronic device in order to supply power that the control circuitry 104 may utilize to charge the battery 103 (although in one or more implementations the control circuitry may be a separate but electrically connected component from the electronic device as well). For example, in some implementations the power generating mechanism may be a hands-free configured device connected to the electronic device via one or more electrical wires and/or other connection mechanisms that a user is able to attach to his face such that his voice and/or breath is able to vibrate the diaphragm of the power generating mechanism in order generate power and/or charge the battery.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. An electronic device, comprising:
   at least one battery that is operable to provide power to operate the electronic device;
   at least one power generating mechanism including at least one diaphragm that is operable to vibrate; and
   control circuitry, electrically coupled to the at least one battery and the at least one power generating mechanism, that charges the at least one battery utilizing power generated by the at least one power generating mechanism;
   wherein the at least one power generating mechanism generates power when the at least one diaphragm vibrates in response to force being exerted upon the at least one diaphragm; and
   wherein the control circuitry charges the at least one battery utilizing the power generated by the at least one power generating mechanism while the electronic device is operating utilizing power front the at least one battery.

2. The electronic device of claim 1, wherein the force being exerted upon the at least one diaphragm comprises at least one of sound waves, air movement, or atmospheric pressure.

3. The electronic device of claim 1, wherein the at least one power generating mechanism further comprises at least one coil of wire positioned around at least one magnet and coupled to the at least one diaphragm and wherein the at least one power generating mechanism generates power by the at least one coil of wire moving with respect to the at least one magnet in response to vibration of the at least one diaphragm.

4. The electronic device of claim 1, wherein the at least one power generating mechanism further comprises at least one piezoelectric element coupled to the at least one diaphragm and wherein the at least one power generating mechanism generates power by vibration of the at least one diaphragm exerting force upon the at least one piezoelectric element.

5. The electronic device of claim 1, wherein the control circuitry is operable to provide the power generated by the at least one power generating mechanism to operate the electronic device.

6. The electronic device of claim 1, wherein the force being exerted upon the at least one diaphragm comprises at least one sound wave and wherein the at least one power generating mechanism includes at least one sound wave focusing guide that focuses the at least one sound wave on the at least one diaphragm.

7. The electronic device of claim 6, wherein the at least one sound wave focusing guide comprises a conical shaped element with a first diameter located proximate to the at least one diaphragm and a second diameter located distal to the at least one diaphragm and wherein the second diameter is greater than the first diameter.

8. The electronic device of claim 1, wherein the electronic device is operable to perform at least one electronic device function related to sound received by at least one sound sensor.

9. The electronic device of claim 8, wherein the electronic device comprises at least one of a portable computer, a telephone, a tablet computer, a personal digital assistant, and a audio recorder.

10. The electronic device of claim 8, wherein the at least one power generating mechanism includes the at least one sound sensor.

11. The electronic device of claim 8, wherein the at least one power generating mechanism and the at least one sound sensor are disposed within a proximity such that sound waves detected by the at least one sound sensor vibrate the at least one diaphragm.

12. The electronic device of claim 1, wherein the at least one power generating mechanism comprises at least one microphone.

13. The electronic device of claim 1, wherein:
   the electronic device further comprises operating components; and
   the electronic device operating utilizing power from the at least one battery comprises the operating components utilizing power from the at least one battery to power as speaker during a telephone call.

14. A method for charging a battery for an electronic device, the method comprising:
   vibrating at least one diaphragm of at least one power generating mechanism by exerting force upon the at least one diaphragm;
   generating power in response to vibration of the at least one diaphragm utilizing the at least one power generating mechanism; and charging at least one battery of an electronic device utilizing the power generated by the at least one power generating mechanism while the electronic device is operating utilizing power from the at least one battery.

15. The method of claim 14, wherein said operation of generating power in response to vibration of the at least one diaphragm utilizing the at least one power generating mechanism further comprises moving at least one coil of wire in relation to at least one magnet that is located adjacent to the at least one coil of wire in response to vibration of the at least one diaphragm.

16. The method of claim 14, wherein said operation of generating power in response to vibration of the at least one diaphragm utilizing the at least one power generating mechanism further comprises exerting force upon at least one piezoelectric element of the at least one power generating mechanism utilizing the at least one diaphragm in response to vibration of the at least one diaphragm.

17. A system for charging a battery for an electronic device, comprising:
   at least one power generating mechanism comprising at least one diaphragm that is operable to vibrate; and
   an electronic device, comprising;
      at least one battery that is operable to provide power to operate the electronic device; and
      control circuitry that charges the at least one battery utilizing power generated by the at least one power generating mechanism while the electronic device is operating utilizing power from the at least one battery;
   wherein the at least one power generating mechanism generates power when the at least one diaphragm vibrates in response to force being exerted upon the at least one diaphragm.

18. The system of claim 17, wherein the at least one power generating mechanism is a component of the electronic device.

19. The system of claim 17, wherein the electronic device comprises at least one of a portable computer, a telephone, a tablet computer, a personal digital assistant, and an audio recorder.

20. The system of claim 17, wherein the force being exerted upon the at least one diaphragm comprises at least one sound wave and wherein the at least one power generating mechanism further comprises at least one sound wave focusing guide that focuses me at least one sound wave on the at least one diaphragm.

* * * * *

UNITED STATES PATENT AND TRADEMARK OFFICE
CERTIFICATE OF CORRECTION

PATENT NO. : 8,836,276 B2  
APPLICATION NO. : 13/042330  
DATED : September 16, 2014  
INVENTOR(S) : Nigel Paul Prescott Page 1 of 1

It is certified that error appears in the above-identified patent and that said Letters Patent is hereby corrected as shown below:

In the Claims

Column 7, line 66, delete "front" and insert -- from --, therefor.

Column 8, line 58, delete "as" and insert -- a --, therefor.

Column 9, line 24, delete ";" and insert -- : --, therefor.

Column 10, line 22, delete "me" and insert -- the --, therefor.

Signed and Sealed this  
Twenty-third Day of December, 2014

Michelle K. Lee  
*Deputy Director of the United States Patent and Trademark Office*